July 9, 1957     J. D. GLEESON     2,798,454
COMBINATION TACHOMETER, SPEEDOMETER AND HOURMETER
Filed Feb. 23, 1955     2 Sheets-Sheet 1
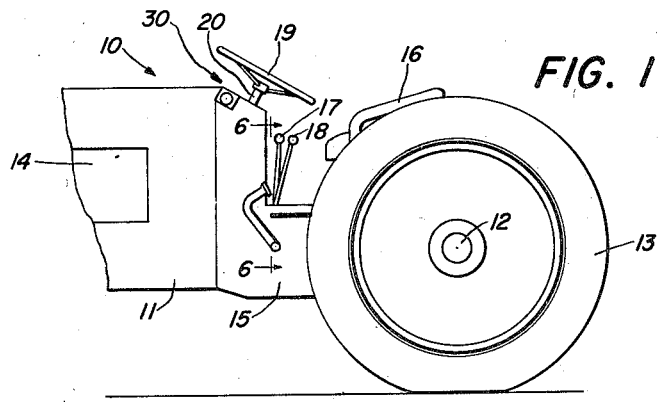
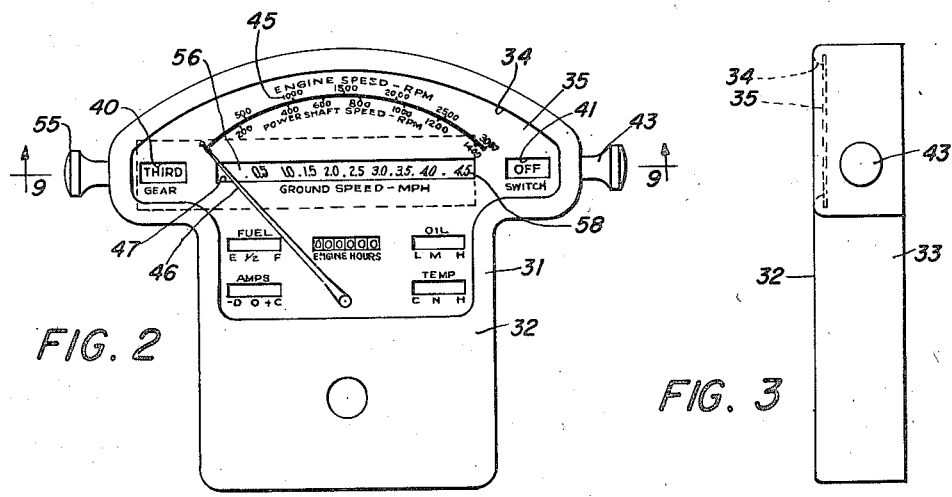
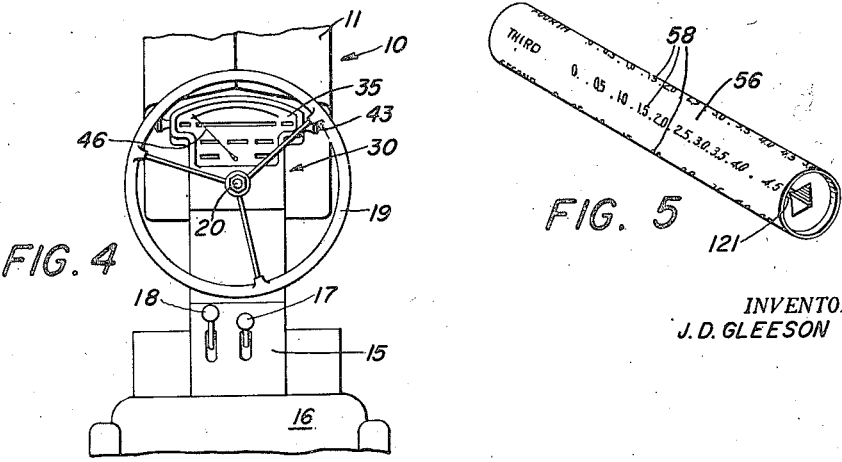
INVENTOR.
J. D. GLEESON July 9, 1957 J. D. GLEESON 2,798,454
COMBINATION TACHOMETER, SPEEDOMETER AND HOURMETER
Filed Feb. 23, 1955 2 Sheets-Sheet 2
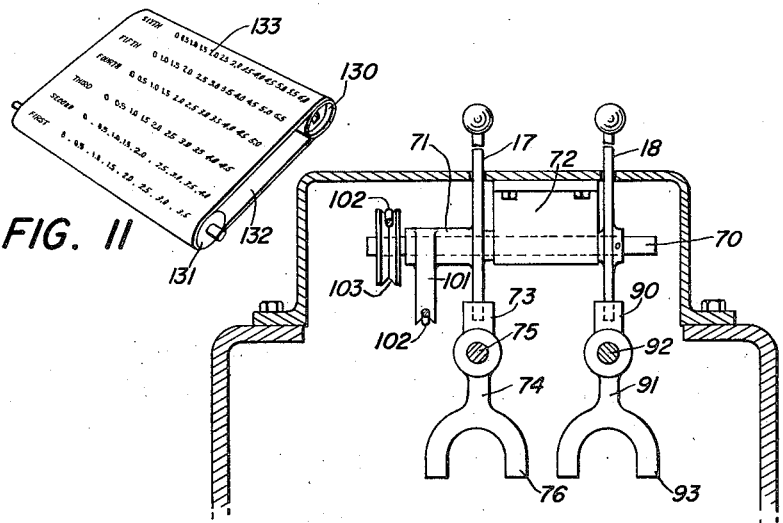
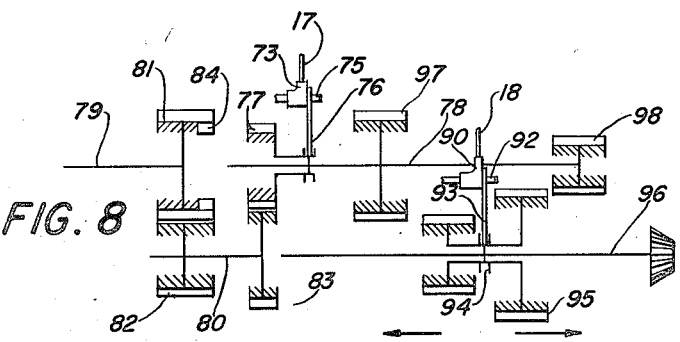
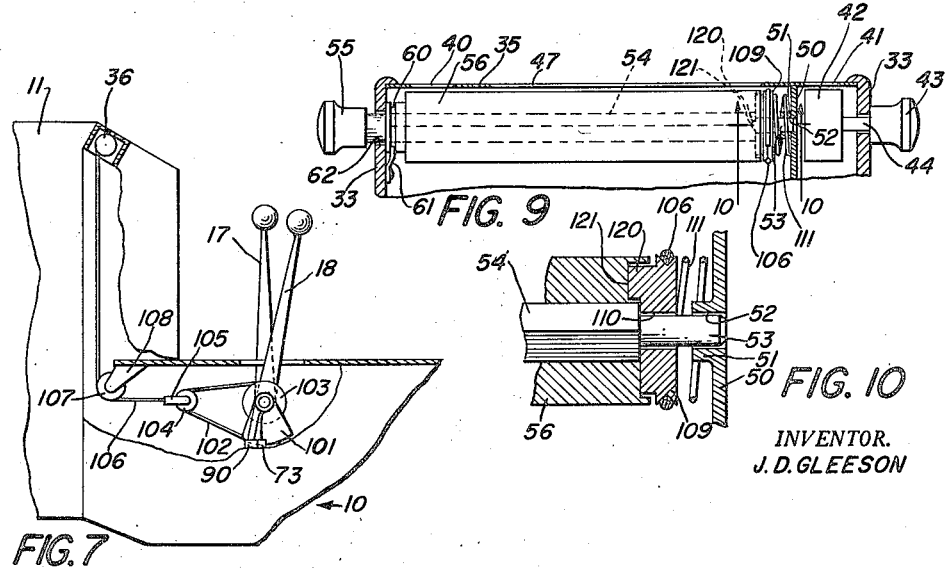
INVENTOR.
J. D. GLEESON United States Patent Office 2,798,454
Patented July 9, 1957

2,798,454

COMBINATION TACHOMETER, SPEEDOMETER AND HOURMETER

John D. Gleeson, Waterloo, Iowa, assignor to Deere Manufacturing Co., Dubuque, Iowa, a corporation of Iowa Application February 23, 1955, Serial No. 489,962

13 Claims. (Cl. 116—133)

This invention relates to an instrument panel for a tractor or other type of vehicle having a power train that includes an engine, a driven member, and an adjustable transmission disposed in the power train between the engine and the driven member for delivering power from the engine to the driven member at a plurality of operating conditions. More particularly, it relates to a device mounted in the instrument panel for providing a correct reading of the rate of operation of a driven member at varying engine speeds and at any setting of the transmission.

The speed of a tractor relative to the ground is determined, as in most other vehicles, by the engine speed and the gear or gear ratio that the transmission is set. The speed of the engine is normally controlled by a governor which will maintain the engine at a constant speed. Normally there is a hand adjustment proximate to the operator's station on the tractor by which the governor may be adjusted, thereby, in effect, causing the engine to be operative through a range of speeds. The gear setting is determined by the type of operation, soil condition, moisture, and other variable factors. Therefore, the rate of operation of a driven member, which in the present example will be the ground speed of the tractor, is determined by the engine speed which is variable by means of adjusting the governor and the gear setting which may be set to one of several available.

In the past, ground speed has commonly been shown, if at all, on the instrument panel by providing a speedometer needle that passed over several rows of markings, each row being indicative of the range of ground speeds that the tractor could travel at each of the gear settings in the transmission. It was then just a simple matter of adjusting the eye to the correct row of markings to obtain the ground speed. This method was practicable as long as there existed a relatively low number of gear settings. More recently, however, the number of settings have been increased to provide proper torque and ground speed under which modern implements are expected to operate until, today, a tractor transmission is often required to have as many as nine or ten gear settings for forward travel as well as three or four for rearward travel.

Basically, therefore, providing an additional row of ground speeds corresponding to each additional gear setting has become impracticable due to the large number of gear settings. It has therefore necessitated a practical method of providing a ground speed reading on the instrument panel that will be readily read, relatively simple and cheaply produced, and that will be available for all the gear settings within the tractor transmission.

It is, therefore, the purpose and main object of this invention to provide an instrument panel that has mounted under it a movable or an adjustable member such as a drum or its equivalent that has several rows of markings thereon, each row of markings being indicative of a range of ground speed that is available in a corresponding gear setting in the tractor transmission. Also provided will be a means for moving or setting the member whereby the row of markings that corresponds to the gear that the tractor is then traveling in will be viewable through a slot cut in the instrument panel. The slot and drum will be positioned under a tachometer needle that is operative from the engine and that will indicate the ground speed that the tractor is traveling as well as the engine speed.

Other objects and advantages of the invention will become apparent to one skilled in the art as the nature of the invention is better understood from the following detailed description illustrated in the accompanying drawings.

Fig. 1 is a side view of a portion of a tractor embodying the invention.

Fig. 2 is a plan view of the instrument panel embodying the invention.

Fig. 3 is a side view of the instrument panel shown in Fig. 2.

Fig. 4 is a perspective of a portion of the tractor as viewed from above and slightly to the rear of the tractor.

Fig. 5 is a perspective view of an indicia-bearing drum used in the instrument panel.

Fig. 6 is a sectional view taken along the line 6—6 of Fig. 1.

Fig. 7 is an enlarged side view of a portion of the gear shifting mechanism and instrument panel with a portion of the tractor removed to show more clearly the means for automatically shifting the rotatable drum when the gear shift levers are operated.

Fig. 8 is a schematic diagram of a gear train operative in a tractor transmission in the type of tractor shown.

Fig. 9 is a sectional view taken along lines 9—9 of Fig. 2.

Fig. 10 is a sectional view taken along lines 10—10 of Fig. 9.

Fig. 11 is a view similar to Fig. 5 showing an indicia-bearing belt which is utilized in a modification of the invention.

With reference to the drawings, reference numeral 10 represents a tractor of a usual commercial type that has a longitudinal body 11 supported at its forward end by suitable front wheels, not shown, and at its rearward end by a transverse axle 12 carried by a pair of transversely spaced apart rear wheels of which only the left rear wheel 13 is shown. A power train includes a drive unit or tractor engine 14, a driven member which is the axle 12, and a transmission 15 which serves as selective means for providing several engine-to-driven member speed ratios. Provided on the tractor is an operator's station proximate to and forwardly of a tractor seat 16. Gear shift levers 17 and 18 extend upwardly from the transmission 15 and are available to an operator normally positioned in the seat 16. Forwardly of and within reach of the operator is a steering wheel 19 mounted on a steering column 20 extending downwardly and forwardly into an instrument panel 30.

Referring to Figs. 2, 3 and 5, the instrument panel comprises an instrument housing 31 that has a substantially laterally disposed surface 32 and depending side and front and rear portions 33 that are suitably attached to upwardly extending sections of the tractor body 11. An opening 34 is provided in the surface 32 of the housing 31 to give viewing access to a faced surface or panel board 35 mounted by suitable means directly beneath the surface 32. Fuel, oil, amperes, and temperature gauges, shown as such in Fig. 2 of the drawings, are mounted on the lower portion of the panel board 35. Also available on the panel board is an hourmeter centrally positioned on the panel board 35. On the left and right side of the panel board, as viewed in Fig. 2, is provided a pair of panel slots 40 and 41. Mounted directly beneath the instrument panel and in a position proximate to the panel slot 41 is an ignition switch 42 controllable by a knob 43 that is positioned outwardly of the side portions 33 and is connected to the switch through a stub shaft 44. Suitable markings indicating whether the switch is in the on or off position may be viewed through the slot 41. Extending across the top of the panel board in an arcuate disposition is a row of graduated markings 45 indicating the engine speed. Also mounted on the instrument panel is indicating means in the form of an indicator or needle 46 that has one end connected to the lower and rear portion of the panel board whereby the opposite end may sweep from side to side over the markings 45 to indicate the engine speed. The indicator or needle 46 is connected to the engine by a tachometer cable (not shown) or other means through which the indicator or needle 46 will be operative from the engine and responsive to changes in speed thereof to move relative to the markings 45 to indicate the speed of the engine. A comparatively longer opening or slot 47 is provided between the slots 40 and 41 and with the slot 40 serves as means for viewing a portion of an indicia-bearing adjustable member or rotatable drum 56 which will presently be described.

Depending from the lower surface of the panel board 35 is a bracket 50 having a boss 51 that is suitably apertured, as at 52, to receive a short cylindrical stub end 53 of a transversely disposed square shaft 54 that extends beneath the face of the panel board and projects through the left side portion 33 of the panel housing. Mounted on the end projecting outwardly of the panel housing 31 is a hand knob 55 through which the shaft 54 may be rotated. As shown in Fig. 5 the indicia-bearing drum member 56 has rows of markings, as indicated by the reference numeral 58, each of the rows of markings being characterized by having at its left end a written number that is indicative of a gear in which the transmission may be set, and continuing from a position proximate to the right end of the number into a series of markings that are indicative of a range of ground speed in miles per hour that the tractor will travel while operating in the corresponding gear setting. The drum member 56 has a square aperture that receives the square shaft 54. The left end portion of the drum 56 is of a smaller diameter than the main section of the drum and has cut therein a peripheral slot 60 that receives a clip 61 that restrains the drum member 56 against axial movement relative to the panel housing 31. A suitable opening 62 is formed in the wall member 33 of the housing to provide rotation of the shaft 54 which has a circular cross section at its end portion that is receivable in the opening 62. Thus, the drum 56 becomes an adjustable or rotatable member capable of being moved to a position where any of the rows of markings 58 will be viewable through the slots 40 and 47 whereby the indicating means or tachometer needle 46 will reflect the ground speed of the tractor.

The shift lever 17 extends from a position above and outwardly of the transmission to a position inside the transmission 15 where it is provided with a hub 71 that is pivotally mounted on a transversely extending shaft 70 which in turn is journaled in a depending bracket 72 which is fixed to the top plate of the transmission housing. The lower end of the lever 17 is articulately held in an upwardly extending stem 73 of a yoke member 74 that is slidably mounted at its midportion on a yoke shaft 75. A bifurcated end 76 of the yoke 74 is positioned in a peripheral slot of the hub of a range selecting gear 77 that is keyed for axial movement to a secondary shaft 78.

Viewing Figs. 6 and 8, therefore, it becomes apparent the shift lever 17 is operative to move the range selector gear 77 into a position shown in Fig. 8 whereby the power received from an engine-driven input or drive shaft 79 is transmitted through a countershaft 80 by a drive shaft pinion 81 and countershaft gear 82 and then back to the secondary shaft 78 through the countershaft pinion 83 and in the range selecting gear 77. A second range may be obtained by moving the range selecting gear 77 into mesh with an internal gear 84 driven directly off of the input drive shaft 79.

The shift lever 18 extends from a position above and outwardly of the transmission 15 to a position inwardly thereof where it is fixed to the shaft 70. The lower end of the gear shift lever 18 is articulately fitted into an upwardly extending portion 90 of a yoke 91 that is slidably mounted at its mid-portion on a corresponding yoke shaft 92. The bifurcated end 93 of the yoke 91 fits in a peripheral slot or groove 94 in the hub of a double gear 95 that is keyed for axial movement along an output drive shaft 96.

Again viewing Figs. 6 and 8 it becomes apparent that the output drive shaft 96 may be driven from the secondary drive shaft 78 by either of the drive pinions 97 or 98 that are fixed to the shaft 78 by mere shifting of the shift lever 18 forwardly or rearwardly to cause the gear 95 to engage one of them.

Integral with the hub 71 of the range selector lever 17 is a range selecting sheave 101 that has mounted on its outside periphery one end of a cable 102. Fixed to one end of the shaft 70 is a gear selecting sheave 103 which will rock upon shifting of the gear shift lever 18 and which has mounted on its outside periphery the opposite end of the cable 102. For purposes that will later become apparent, the sheave 101 has substantially twice the radius of the sheave 103. A mid-portion of the cable 102 is threaded over a pulley 104 that is held between a pair of fore-and-aft extending legs of a U-shaped bracket 105. A second cable 106 is fixed to the U-shaped bracket 105 and extends forwardly to a directional pulley 107 which is connected to the upper plate of the transmission housing by means of a depending bracket 108. The other end of the cable 106 is threaded over and is connected to a speed-indicating-drum-positioning pulley 109 that is journaled, as at 110, on the stub end 53 of the square shaft 54. Tension is maintained in both cables 102 and 106 by means of a pretensioned torsion spring 111 mounted concentric with the shaft 54 and having opposite ends thereof connected respectively to the bracket 50 and the face of the drum-positioning pulley 109 and which serves to prevent rotation of the pulley 109 other than that caused by shifting of the gear levers 17 and 18.

As shown specifically in Figs. 9 and 10, the speed indicating drum 56 is driven by the drum-positioning pulley 109 by means of a V-shaped projection 120 that is integral with the pulley 109 and that is receivable in a notch 121 cut in the end of the drum 56. The projection 120 is normally held in the notch by means of the torsion spring 111 providing axial thrust toward the drum 56 on the pulley 109. The pulley 109 also abuts one end of the square sectioned portion of the shaft 54. With this arrangement, by applying an axial thrust on the knob 55 opposite to that of the spring 111, the V-shaped projection 120 will be moved axially to a position out of engagement with the notch 121 thereby serving to disengage the pulley 109 from the drum 56 which will permit the speed-indicating drum member 56 to be turned manually by rotating the knob 55.

Normally, however, it is desirable to have the U-shaped projection 120 in mesh with the notch 121 whereby the speed recording drum member will be automatically shifted to the correct reading as the gear shift levers 17 and 18 are shifted which may be done through proper sizing of the sheaves 101 and 103 and the drum-positioning pulley 109 and which is done in the instant case by providing a 2 to 1 ratio in the radii of the sheaves 101 and 103. Thus, the pulley and cable arrangement extending from the sheaves 101, 103 to the speed indicating drum 56 serves as means for automatically positioning the row of markings corresponding to the gear setting as the transmission is shifted, while the knob 55 serves as means for manually positioning the adjustable member 56 as well as means for disengaging the automatic means of adjusting the member 56.

For purposes of description the invention has been described in relation to a transmission having a four speed drive forwardly and the speed recording drum shown as having a corresponding number of rows of markings. However in many tractors, particularly in the more recent models, there exists several gear settings for selectively moving the tractor both forwardly and in reverse. There also exists the possibility of driving other driven members such as a belt pulley, power take-off shaft, etc. in one of several gear settings as well as numerous implements, all of which might have a rate of operation which it would be desirous to have appear on the instrument panel. It is obvious that a considerably larger number of rows of markings may be made available on the speed recording drum member 56 in order that all of the ranges of ground speeds corresponding to the various gear settings and the ranges of rates of operation of the other members driven by the tractor engine may be reflected on the instrument panel.

A modification of the invention is provided as shown in Fig. 11. In this modification there is provided a pair of rollers 130 and 131. Both rollers are disposed transversely and beneath the panel board 35, the first roller 130 being mounted beneath the panel board 35 in a manner not unlike that previously described in reference to the speed recording drum member 56. The other roller 131 is parallel to the driven drum 130 and is suitably journaled at opposite ends to the panel housing 31. Mounted over the rollers 130 and 131 is an endless flat belt 132. Several rows of markings 133 are provided on the surface of the flat belt with each row of markings indicating a range of ground speeds that the tractor will travel at a corresponding gear setting, or, if it is desired, indicating a rate of operation of any other driven member on or off of the tractor at one of the gear settings. In a manner similar to that described in reference to the other form of the invention, by suitable arrangement in size and positions of the pulleys and drums the flat belt 132 may automatically be adjusted whereby the row of markings 133 that corresponds to the gear setting may be viewable through the slot 41 in the instrument panel board 35, or it may be adjusted manually through rotation of the knob 55.

While only one modification of the invention has been shown, it should be recognized that other forms and variations could exist without departing basically from the broad general principles herein claimed. It should therefore be understood that while the preferred embodiments of the invention have been described with the view of clearly and concisely illustrating the invention, it is desired not to so limit or narrow the invention beyond that which is claimed.

What is claimed is:

1. An improvement for an instrument for use on a tractor or other type of vehicle having a variable speed power source, a driven member, and an adjustable variable speed transmission delivering power from the engine to the driven member, the instrument including a faced member characterized by having a slot therein and having thereon a series of graduated markings representative of various rates of operation of the power source and indicating means operatively responsive to variations in the rate of operation of the power source to move relative to the markings thereby reflecting the rate of operation of the power source, the improvement residing in: an adjustable member having several rows of graduated markings, each of the rows of markings being indicative of a range of rate of operation in which the driven member will operate corresponding to one of a plurality of settings that the transmission may be adjusted to; means mounting the adjustable member on the vehicle proximate to the slot whereby a portion of the adjustable member is viewable through the slot; and means for moving the adjustable member to a position whereby the row of markings corresponding to the setting that the transmission is adjusted to may be viewable in the slot thereby permitting the indicating means to also reflect the rate of operation of the driven member.

2. An instrument for a tractor or other type of vehicle having a variable speed power source and a transmission delivering power from the engine to a driven member at a plurality of operating conditions, comprising: a faced member characterized by having an opening therein; indicating means operatively responsive to variations in the rate of operation of the power source to move relative to the opening; an adjustable member having several rows of graduated markings, each of the rows of markings being indicative of a range of rate of operation in which the driven member will operate corresponding to an operating condition that the transmission may be adjusted to; means mounting the adjustable member on the vehicle proximate to the opening whereby a portion of the adjustable member is viewable through the opening; and means for moving the adjustable member to a position whereby the row of markings corresponding to the operating condition that the transmission is adjusted to may be viewable in the opening thereby permitting the indicating means to reflect the rate of operation of the driven member.

3. For an assembly having a variable speed drive unit and selective means for delivering power from the drive unit at a plurality of conditions; the improvement residing in an instrument having a faced member and associated indicating means operatively responsive to variations in speed of the drive unit to move relative to the faced member, the faced member being characterized by having a slot therein proximate to the indicating means, an adjustable member having rows of markings, each of the rows of markings being indicative of a range of rate of operations through which a driven member operative from the selective means will operate at one of said plurality of conditions, and means mounting the adjustable member proximate to the slot to cause a portion thereof to appear through the slot, and means for moving the adjustable member to cause the row of markings corresponding to the condition that the driven member is then operating to appear in the slot whereby the indicating means will reflect the rate of operation of the driven member.

4. For an assembly having a variable speed drive unit and selective means for delivering power from the drive unit at a plurality of conditions; the improvement residing in an instrument having a faced member and associated indicating means operatively responsive to variations in speed of the drive unit to move relative to the faced member, an adjustable member having rows of markings, each of the rows of markings being indicative of a range of rate of operations through which a driven member operative from the selective means will operate at one of said plurality of conditions, and means mounting the adjustable member proximate to the faced member, and means for selectively adjusting the adjustable member to cause the row of markings corresponding to the condition that the driven member is then operating to be positioned whereby the indicating means will reflect the rate of operation of the driven member.

5. The invention defined in claim 4, in which said means for moving the adjustable member is in the form of a manually operative member mounted on the exterior of the instrument and connected to the adjustable member.

6. The invention defined in claim 5, in which the means for moving the adjustable member also includes automatic adjustable means operative from the selective means to automatically move the adjustable member upon adjustment of the selective means, and further includes means for engaging or disengaging the automatic adjustable means.

7. An instrument for a drive assembly having an indicator movable in response to variations in speed of a variable speed drive unit of the assembly, a member having thereon indicia indicative of a plurality of operating conditions of the assembly, said member being adjustable to permit indicia pertaining to one of said plurality of operating conditions to be positioned relative to the indicator to permit the latter to reflect the rate of operation of the assembly at the condition, and means for selectively adjusting the member.

8. The invention defined in claim 7, in which the indicia bearing member is in the form of a rotatable drum having thereon a plurality of peripherally spaced rows of markings each row of markings being indicative of one of said plurality of operating conditions.

9. The invention defined in claim 7, in which the indicia bearing member is in the form of a belt having thereon a plurality of rows of markings, each row of markings being indicative of one of said plurality of operating conditions, and the means for adjusting the belt is in the form of a belt drive that is selectively adjustable for moving the row of markings corresponding to the operating condition of the assembly to a position whereby the indicator will reflect the rate of operation of the assembly.

10. An instrument panel for a drive assembly having a panel board with an opening therein, an indicator movable relative to the board in response to variations in speed of a variable speed drive unit of the assembly, an adjustable member having thereon indicia indicative of a plurality of operating conditions of the assembly and mounted relative to the board to permit viewing of a portion of the member through the opening, and means for selectively adjusting the member to a position whereby indicia pertaining to one of said plurality of operating conditions is viewable through the opening to permit the indicator to reflect the rate of operation of the assembly at the condition.

11. For an instrument panel for indicating the ground speed of a tractor or other type of vehicle having an engine operative through a range of speeds and an adjustable transmission for delivering power from the engine to drive ground wheels on the tractor at a plurality of engine-to-ground wheel speed ratios comprising: a panel board having an opening therein and having thereon a series of graduated markings representative of various speeds within the engine speed range, an indicator operative from the engine and responsive thereto to move relative to the markings to indicate the speed of the engine, an adjustable member having several rows of graduated markings, each of the rows of markings being indicative of a range of ground speed that will correspond to an engine-to-ground wheel speed ratio adjustable to by the transmission, and means mounting the adjustable member on the tractor proximate to the opening whereby a portion of the adjustable member will appear through the opening, and means for moving the adjustable member to a position permitting the row of markings corresponding to the engine-to-ground wheel speed ratio that the transmission is adjusted to appear in the opening whereby the indicator will also reflect the ground speed.

12. For an instrument panel for indicating the ground speed of a tractor or other type of vehicle having an engine operative through a range of speeds and an adjustable transmission for delivering power from the engine to drive ground wheels on the tractor at a plurality of engine-to-ground wheel speed ratios; comprising: a panel board having an opening therein, an indicator operative from the engine and responsive thereto to move relative to the panel board, an adjustable member having several rows of graduated markings, each of the rows of markings being indicative of a range of ground speed that will correspond to an engine-to-ground wheel speed ratio adjustable to by the transmission, and means mounting the adjustable member on the tractor proximate to the opening whereby a portion of the adjustable member will appear through the opening, and means for moving the adjustable member to a position permitting the row of markings corresponding to the engine-to-ground wheel speed ratio that the transmission is adjusted to appear in the opening whereby the indicator will reflect the ground speed.

13. For an assembly having a variable speed drive unit and selective means for delivering power from the drive unit at a plurality of conditions; the improvement residing in an instrument having a faced member and associated indicating means operatively responsive to variations in speed of the drive unit to move relative to the faced member, the faced member being characterized by having an opening therein proximate to the indicating means, an indicia bearing member having a plurality of markings, each marking being indicative of an operation of a driven member operative from the selective means at one of said plurality of conditions, and means mounting the indicia bearing member proximate to the opening to cause a portion thereof to appear through the opening, and means for providing relative movement between the faced member and the indicia bearing member to cause the markings corresponding to the condition that the driven member is then operating to appear in the opening whereby the indicating means will reflect the operation of the driven member.

References Cited in the file of this patent

UNITED STATES PATENTS

| | | |
|---|---|---|
| 1,417,049 | Farmer | May 23, 1922 |
| 2,702,520 | Helgeby | Feb. 22, 1955 |

FOREIGN PATENTS

| | | |
|---|---|---|
| 114,677 | Great Britain | Apr. 18, 1918 |